(12) United States Patent
Sim-Tang

(10) Patent No.: US 7,565,661 B2
(45) Date of Patent: Jul. 21, 2009

(54) METHOD AND SYSTEM FOR REAL-TIME EVENT JOURNALING TO PROVIDE ENTERPRISE DATA SERVICES

(76) Inventor: Siew Yong Sim-Tang, 12916 Glen Brae Dr., Saratoga, CA (US) 95070

( * ) Notice: Subject to any disclaimer, the term of this patent is extended or adjusted under 35 U.S.C. 154(b) by 532 days.

(21) Appl. No.: 10/842,286

(22) Filed: May 10, 2004

(65) Prior Publication Data
US 2005/0251540 A1   Nov. 10, 2005

(51) Int. Cl.
G06F 9/54 (2006.01)
G06F 11/00 (2006.01)

(52) U.S. Cl. .................. 719/318; 719/314; 714/48
(58) Field of Classification Search ............ 719/314, 719/318; 709/223; 707/103 X, 200; 714/48
See application file for complete search history.

(56) References Cited

U.S. PATENT DOCUMENTS

| | | | |
|---|---|---|---|
| 5,729,743 A | 3/1998 | Squibb | |
| 5,893,119 A | 4/1999 | Squibb | |
| 6,158,019 A * | 12/2000 | Squibb | 714/13 |
| 6,189,016 B1 * | 2/2001 | Cabrera et al. | 707/203 |
| 6,366,988 B1 | 4/2002 | Skiba et al. | |
| 6,389,427 B1 * | 5/2002 | Faulkner | 707/104.1 |
| 6,460,055 B1 | 10/2002 | Midgley et al. | |
| 6,463,565 B1 | 10/2002 | Kelly et al. | |
| 6,487,561 B1 | 11/2002 | Ofek et al. | |
| 6,526,418 B1 | 2/2003 | Midgley et al. | |
| 6,625,623 B1 | 9/2003 | Midgley et al. | |
| 6,751,753 B2 | 6/2004 | Nguyen et al. | |
| 6,779,003 B1 | 8/2004 | Midgley et al. | |
| 6,816,872 B1 | 11/2004 | Squibb | |
| 6,826,711 B2 | 11/2004 | Moulton et al. | |
| 6,847,984 B1 | 1/2005 | Midgley et al. | |
| 6,993,706 B2 | 1/2006 | Cook | |
| 7,039,663 B1 * | 5/2006 | Federwisch et al. | 707/205 |
| 7,325,159 B2 * | 1/2008 | Stager et al. | 714/13 |

* cited by examiner

*Primary Examiner*—Li B Zhen
(74) *Attorney, Agent, or Firm*—Winstead PC

(57) ABSTRACT

A data management system or "DMS" provides a wide range of data services to data sources associated with a set of application host servers. The data management system typically comprises one or more regions, with each region having one or more clusters. A given cluster has one or more nodes that share storage. To facilitate the data service, a host driver embedded in an application server connects an application and its data to a cluster. The host driver provides a method and apparatus for capturing real-time data modifications and application state notifications and, in response, generating data transactions in the form of an event journal that is provided to the data management system. The driver functions to translate traditional file/database/block I/O into a continuous, application-aware, output data stream. Using the streams generated in this manner, the DMS offers a wide range of data services that include, by way of example only: data protection (and recovery), and disaster recovery (data distribution and data replication).

19 Claims, 9 Drawing Sheets

METHOD AND SYSTEM FOR REAL-TIME EVENT JOURNALING TO PROVIDE ENTERPRISE DATA SERVICES

CROSS-REFERENCE TO RELATED APPLICATION

This application is related to commonly-owned application Ser. No. 10/841,398, filed May 7, 2004, now U.S. Pat. No. 7,096,392, and titled "METHOD AND SYSTEM FOR AUTOMATED, NO DOWNTIME, REAL-TIME, CONTINUOUS DATA PROTECTION.

BACKGROUND OF THE INVENTION

1. Technical Field

The present invention relates generally to enterprise data protection and data management.

2. Background of the Related Art

A critical information technology (IT) problem is how to cost-effectively deliver network wide data protection and rapid data recovery. In 2002, for example, companies spent an estimated $50B worldwide managing data backup/restore and an estimated $30B in system downtime costs. The "code red" virus alone cost an estimated $2.8B in downtime, data loss, and recovery. The reason for these staggering costs is simple—traditional schedule based tape and in-storage data protection and recovery approaches can no longer keep pace with rapid data growth, geographically distributed operations, and the real time requirements of 24×7×265 enterprise data centers.

Traditionally, system managers have use tape backup devices to store system data on a periodic basis. For example, the backup device may acquire a "snapshot" of the contents of an entire hard disk at a particular time and then store this for later use, e.g., reintroduction onto the disk (or onto a new disk) should the computer fail. Typically, snapshot techniques fall into one of three categories: hot, warm and cold. A hot snapshot is created while applications continue running; this creates difficulties if critical data is being modified at the time. In particular, a "hot" snapshot may have an incomplete update such that, when the data is reintroduced, it is not fully consistent. Cold snapshot requires that applications that may be modifying data be shutdown to generate a consistent image in storage. This technique causes significant application downtime. Warm snapshot can only be applied on very specific applications, such as a database that implements a standby mode where all modified data is flushed to storage; in this mode a given application may continue to receive request, but it does not modify data in the storage until it gets out of the standby mode. In most databases, this is known as "quiescent" mode and, for example, a database may enter this mode when it receives a "lock" command. While a consistent database snapshot can be generated using a warm snapshot, any data change that occurs after a snapshot (and before the next one) is at risk, resulting in data loss.

Thus, the problems with the snapshot approaches are well known and can be summarized. First, critical data can change as the snapshot is taken, which results in incomplete updates (e.g., half a transaction) being captured so that, when reintroduced, the data is not fully consistent. Second, changes in data occurring after a snapshot is taken are always at risk. Third, as storage device size grows, the burst of bandwidth required to repeatedly offload snapshots and store the complete snapshot can become impractical. Moreover, the amount of storage resources required to store the snapshots can become impractical, even in small systems without significant data changes. Most importantly, storage based snapshot does not capture fine grain application data and, therefore, it cannot recover fine grain application data objects without reintroducing (i.e. recovering) the entire backup volume to a new application computer server to extract the fine grain data object.

There have been many approaches to try to solve these deficiencies. One approach, known as block journaling, records every disk block change as it happens. Block level journaling is a storage-based approach to data protection. To perform block journaling, a secondary storage must by available. For all primary storage volumes to be protected, an initial image is first copied to the secondary storage. Once the initialization is complete, an agent must be used to capture real-time block changes. The data capturing agent records in real-time all the changed blocks. The block journal is written into the secondary storage. In particular, if a given block is modified, a block journal in the secondary storage saves both the original block and the modified block. An analogous solution is block level mirroring, which differs only in that the original block is overwritten (with the modified block) as the block journal is saved in the secondary storage. While block journaling has advantages over schedule-based tape solutions, it has other problems that make it a less than desirable approach. In particular, block-level solutions cannot perform automated recovery with application consistency and zero data loss. In addition, without manual shutdown procedures these solutions cannot protect many types of applications such as email servers and network file servers. Block level data protection also requires excessive amounts of storage and bandwidth, and it cannot be cost-effectively applied to multi-site disaster recovery. Because block-level protection has to deal with large amounts of raw blocks, its failure modes are likely to be disruptive to primary applications when applied to real-time protection.

Yet another approach is known as file journaling. File journal-based technologies are an improvement over block journaling, but they also have fundamental limitations that prevent them from moving to support rich data services or global data management and automated recovery capabilities. File journaling records only file changes, as such changes occur. It preserves all file changes in the exact order and form. While file journaling facilitates database recovery to any point in time with consistency, that reconstruction has to be done manually. This is because file journaling techniques do not capture or store application relevant events or otherwise preserve knowledge of actual transactions, file types, file relationships or other metadata. The only object that can be recovered is the file. In addition, to preserve the change order, file journaling cannot extract deltas (differences) from the application changes. Thus, although file journaling techniques have advantages over block journaling solutions, they are only file system aware only. Finally, as existing file journaling solutions are PC-based and use a standalone SQL database to store data, from an architectural standpoint they are not well-suited to scaling to support heterogeneous, enterprise-wide data management.

Thus, there remains a long-felt need to provide new and effective solutions to these and other problems in the art.

BRIEF SUMMARY OF THE INVENTION

A data management system or "DMS" provides a wide range of data services to data sources associated with a set of application host servers. The data management system typically comprises one or more regions, with each region having one or more clusters. A given cluster has one or more nodes that share storage. To facilitate the data service, a host driver embedded in an application server connects an application and its data to a cluster. The host driver provides a method and apparatus for capturing real-time data transactions in the form of an event journal that is provided to the data management system. The driver functions to translate traditional file/database/block I/O into a continuous, application-aware, output data stream. Application aware event journaling is a technique to create real-time data capture so that, among other things, consistent data checkpoints of an application can be identified and metadata can be extracted. For example, application awareness is the ability to distinguish a file from a directory, a journal file from a control or binary raw data file, or to know how a file or a directory object is modified by a given application. Thus, when protecting a general purpose file server, an application aware solution is capable of distinguishing a file from a directory, and of identifying a consistent file checkpoint, and of interpreting and capturing file system object attributes such as an access control list. Another example of application awareness is the ability to identify a group of related files, directories or raw volumes that belong to a given application. Thus, when protecting a database with an application aware solution, the solution is capable of identifying the group of volumes or directories and files that make up a given database, of extracting the name of the database, and of distinguishing journal files from binary table files and control files. Generalizing, application aware event journaling according to the present invention tracks granular application consistent checkpoints; thus, when DMS is used to provide file system data protection to a given data source, it is capable of reconstructing an application data state to a consistent point-in-time in the past. When DMS is used to provide database data protection, it enables retrieval of a granular object in the past without having to recover an entire volume. The above, of course, are merely representative examples.

Using the streams generated in this manner, the DMS offers a wide range of real time data services that include, by way of example only: data protection (and recovery), and disaster recovery (data distribution and data replication),. The data services and, in particular, data protection and disaster recovery, are data services where meaningful application and data events are forwarded from one end point to another end point continuously as a stream. More generally, according to the invention, a stream-based data service is a service that involves two end points sending a stream of real-time application and data events.

The DMS host driver includes an I/O filter to intercept data events between an application and its primary data storage. The host driver may also receive data and application events directly from the application and its associated database. In an illustrative embodiment, the host driver may be embedded in the host server where the application resides, or in the network on the application data path. By capturing data through the application, fine grain data can be captured and used to facilitate the data services. In addition, by capturing application events, application consistency checkpoints can be determined.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
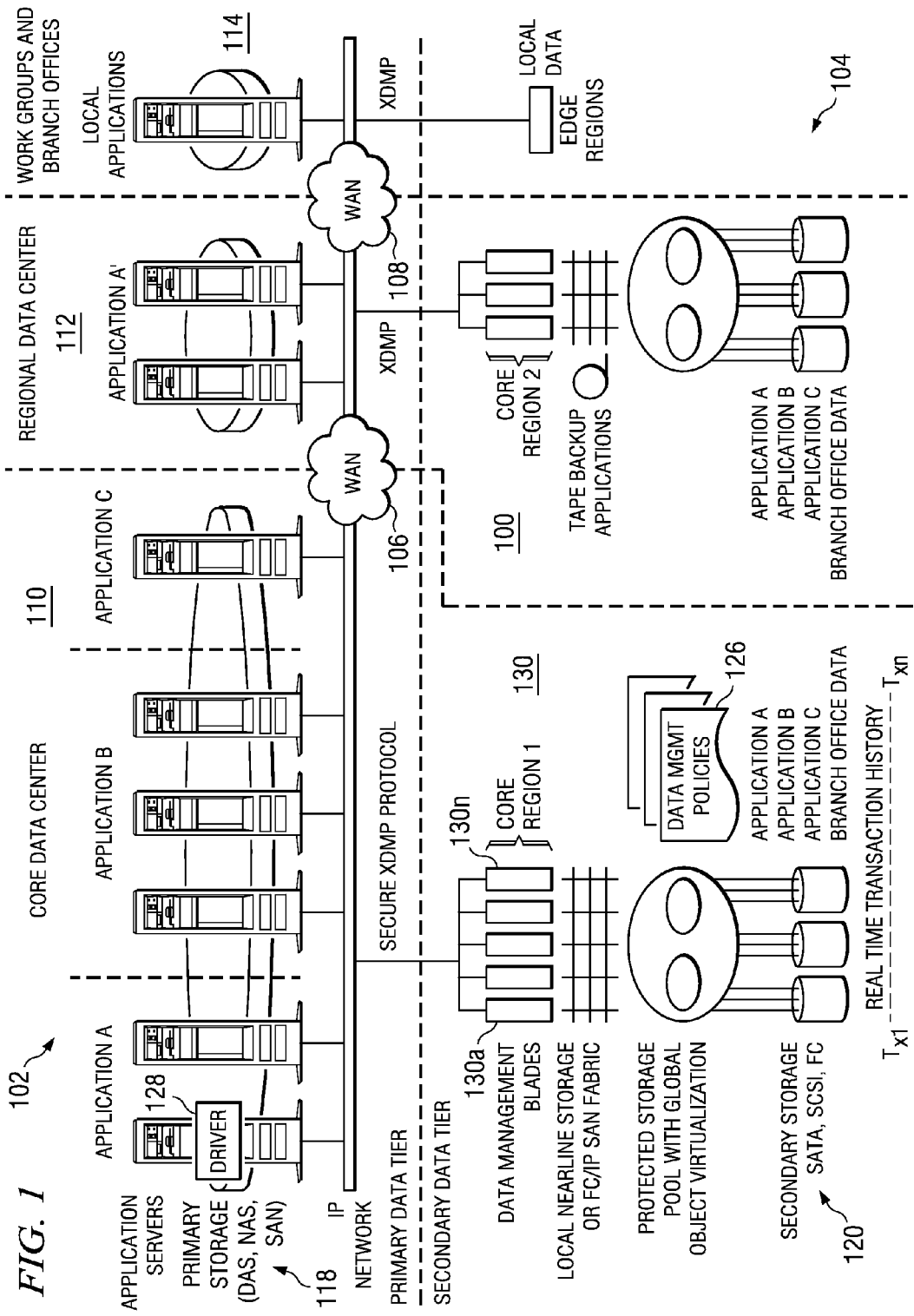
FIG. 1 is an illustrative enterprise network in which the present invention may be deployed.

FIG. 1 illustrates a representative enterprise 100 in which the present invention may be implemented. This architecture is meant to be taken by way of illustration and not to limit the applicability of the present invention. In this illustrative example, the enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers (as described below) to provide real-time data services. Preferably, and as described below, the real-time data services are provided through a given I/O protocol for data transfer. Data management policies 126 are implemented across the secondary storage in a well-known manner. A similar architecture is provided in data center 112. In this example, the regional office 114 does not have its own secondary storage, but relies instead on the facilities in the primary data centers.

According to the invention, a "host driver" 128 is associated with one or more of the application(s) running in the application servers 116 to transparently and efficiently capture the real-time, continuous history of all (or substantially all) transactions and changes to data associated with such application(s) across the enterprise network. As will be described below, the present invention facilitates real-time, so-called "application aware" protection, with substantially no data loss, to provide continuous data protection and other data services including, without limitation, data distribution, data replication, data copy, data access, and the like. In operation, a given host driver 128 intercepts data events between an application and its primary data storage, and it may also receive data and application events directly from the application and database. In a representative embodiment, the host driver 128 is embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130*a-n* that cooperate with the host drivers 128 to facilitate the data services. In this illustrative example, the data center 110 supports a first core region 130, and the data center 112 supports a second core region 132. A given data management server 130 is implemented using commodity hardware and software (e.g., an Intel processor-based blade server running Linux operating system, or the like) and having associated disk storage and memory. Generalizing, the host drivers 128 and data management servers 130 comprise a data management system (DMS) that provides potentially global data services across the enterprise.

Figure 2:
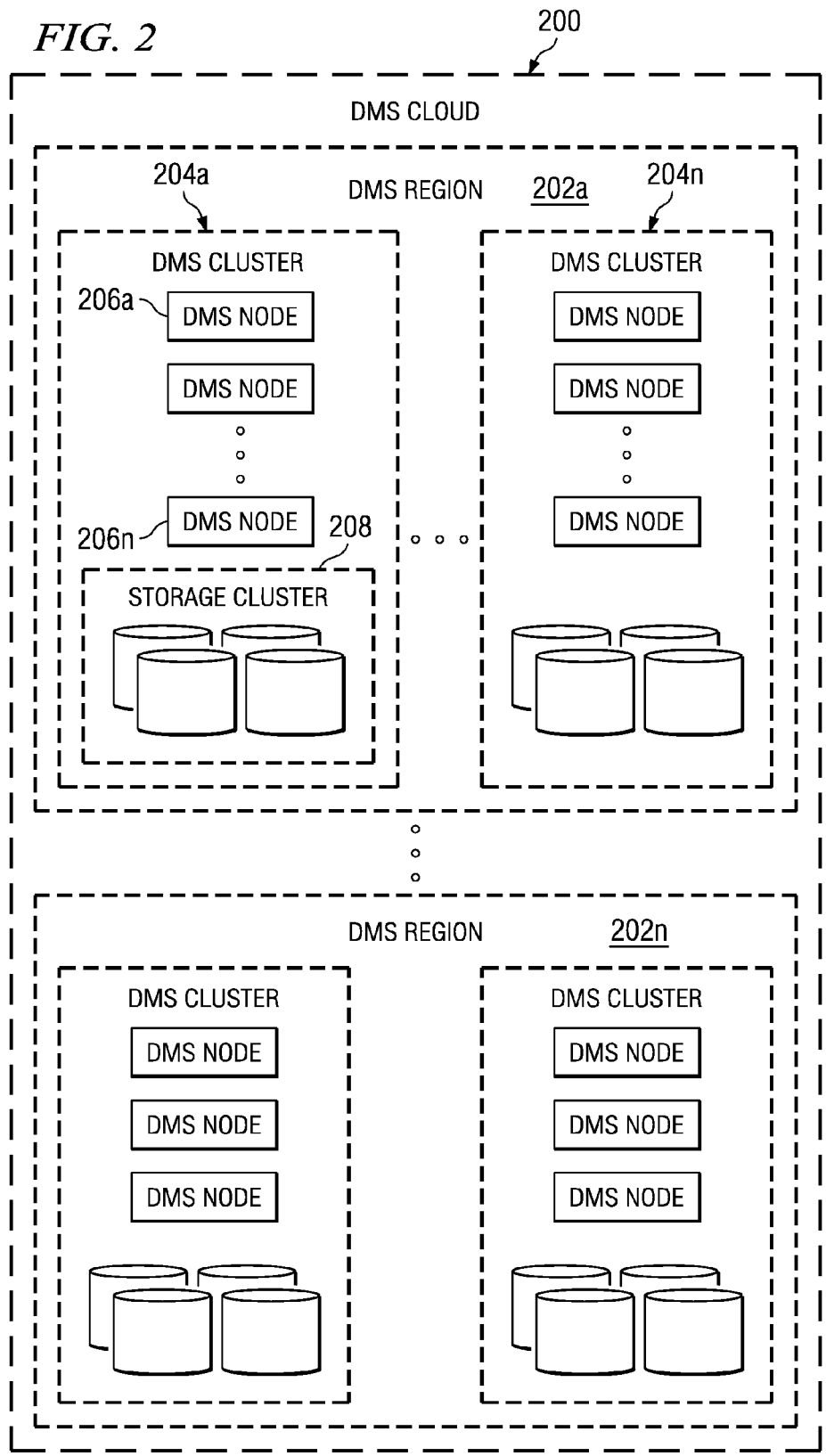
FIG. 2 is an illustration of a general data management system (DMS) of the present invention.

FIG. 2 illustrates a preferred hierarchical structure of a data management system 200. As illustrated, the data management system 200 comprises one or more regions 202*a-n*, with each region 202 comprising one or more clusters 204*a-n*. A given cluster 204 includes one or more nodes 206*a-n* and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be redirected to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
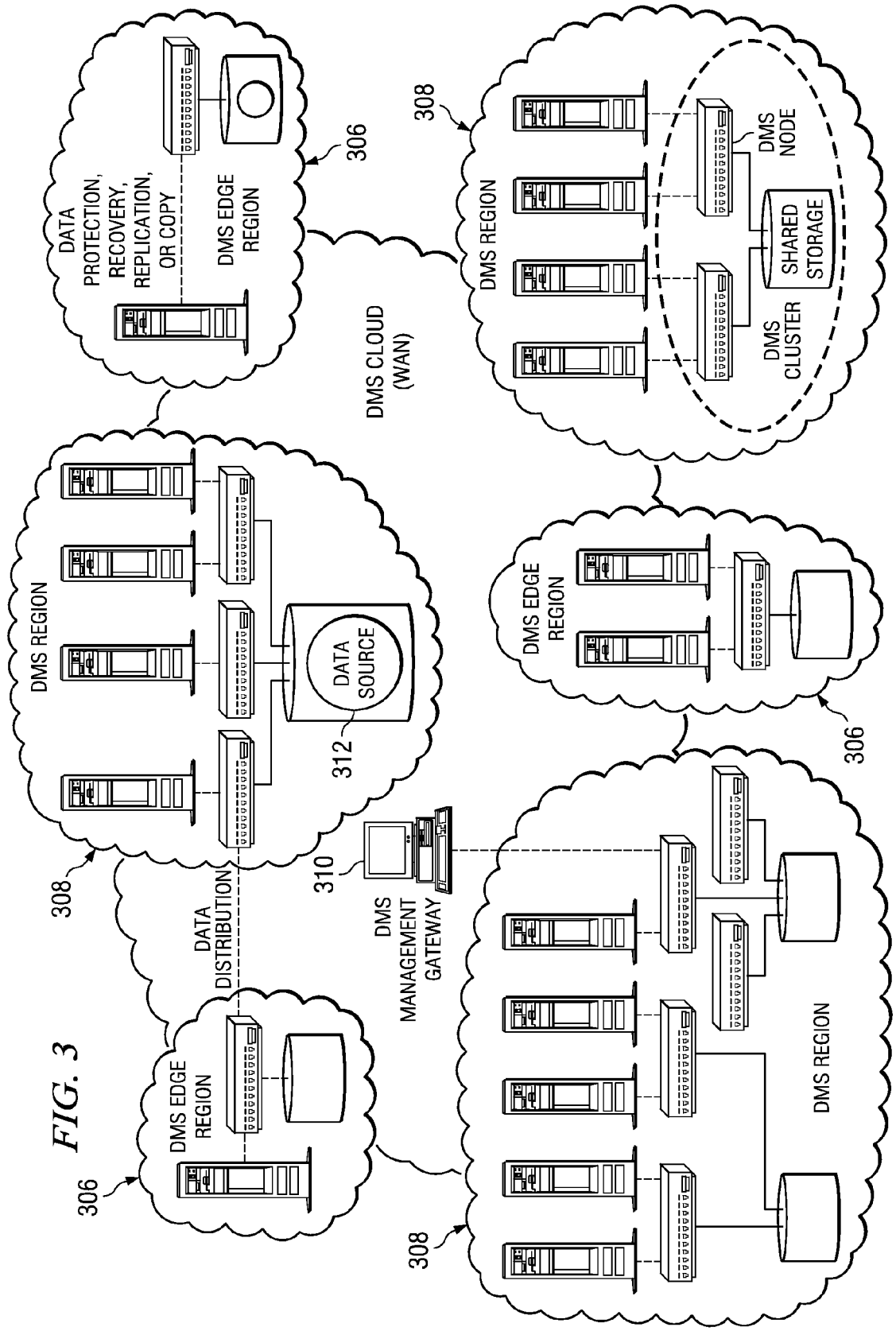
FIG. 3 is an illustration of a representative DMS network according to one embodiment of the present invention.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes one or more management gateways 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS region captures a range of history and continuous changes of, for example, an external data source in a host server. A data source may reside in any cluster of a region, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand replication to bring in the data.

Figure 4:
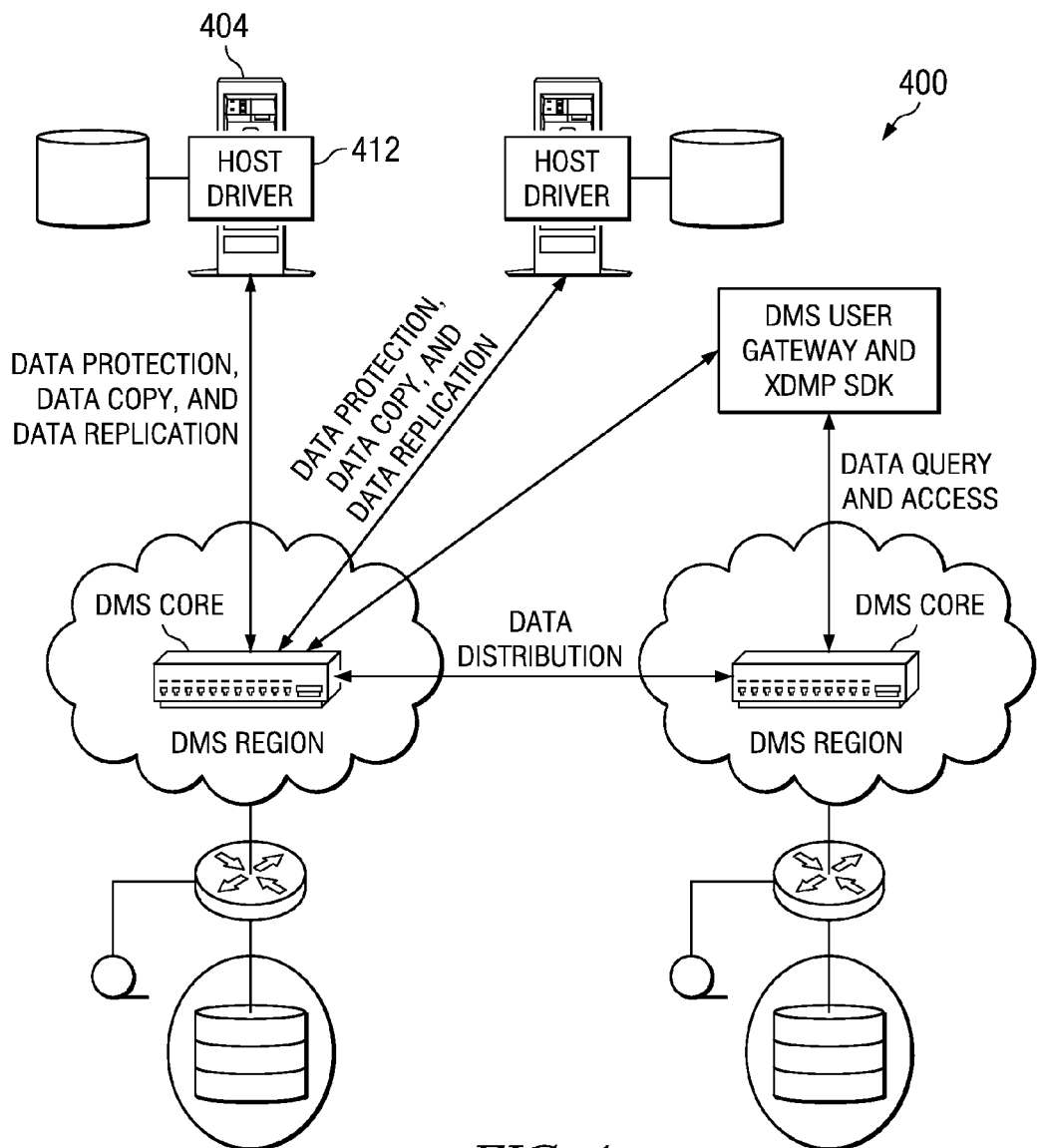
FIG. 4 illustrates how a data management system may be used to provide one or more data services according to the present invention.

Referring now to FIG. 4, an illustrative DMS network 400 provides a wide range of data services to data sources associated with a set of application host servers. As noted above, and as will be described in more detail below, the DMS host driver 402 embedded in an application server 404 connects the application and its data to the DMS cluster. In this manner, the DMS host drivers can be considered as an extension of the DMS cloud reaching to the data of the application servers. As illustrated in FIG. 4, the DMS network offers a wide range of data services that include, by way of example only: data protection (and recovery), disaster recovery (data distribution and data replication), data copy, and data query and access. The data services and, in particular, data protection and disaster recovery, preferably are stream based data services where meaningful application and data events are forwarded from one end point to another end point continuously as a stream. More generally, according to the invention, a stream-based data service is a service that involves two end points sending a stream of real-time application and data events. For data protection, this means streaming data from a data source (e.g., an external host server) into a DMS cluster, where the data source and its entire history can be captured and protected. Data distribution refers to streaming a data source from one DMS cluster into another DMS cluster, while data replication refers to streaming a data source from a DMS cluster to another external host server. Preferably, both data distribution and data replication are real-time continuous movement of a data source from one location to another to prepare for disaster recovery. Data replication differs from data distribution in that, in the latter case, the data source is replicated within the DMS network where the history of the data source is maintained. Data replication typically is host based replication, where the continuous events and changes are applied to the host data such that the data is overwritten by the latest events; therefore, the history is lost. Data copy is a data access service where a consistent data source (or part of a data source) at any point-in-time can be constructed and retrieved. This data service allows data of the most current point-in-time, or a specific point-in-time in the past, to be retrieved when the data is in a consistent state. These data services are merely representative.

According to the invention, the DMS provides these and other data services in real-time with data and application awareness to ensure continuous application data consistency and to allow for fine grain data access and recovery. To offer such application and data aware services, the DMS has the capability to capture fine grain and consistent data. As will be illustrated and described, a given DMS host driver uses an I/O filter to intercept data events between an application and its primary data storage. The host driver also receives data and application events directly from the application and database.

Figure 5:
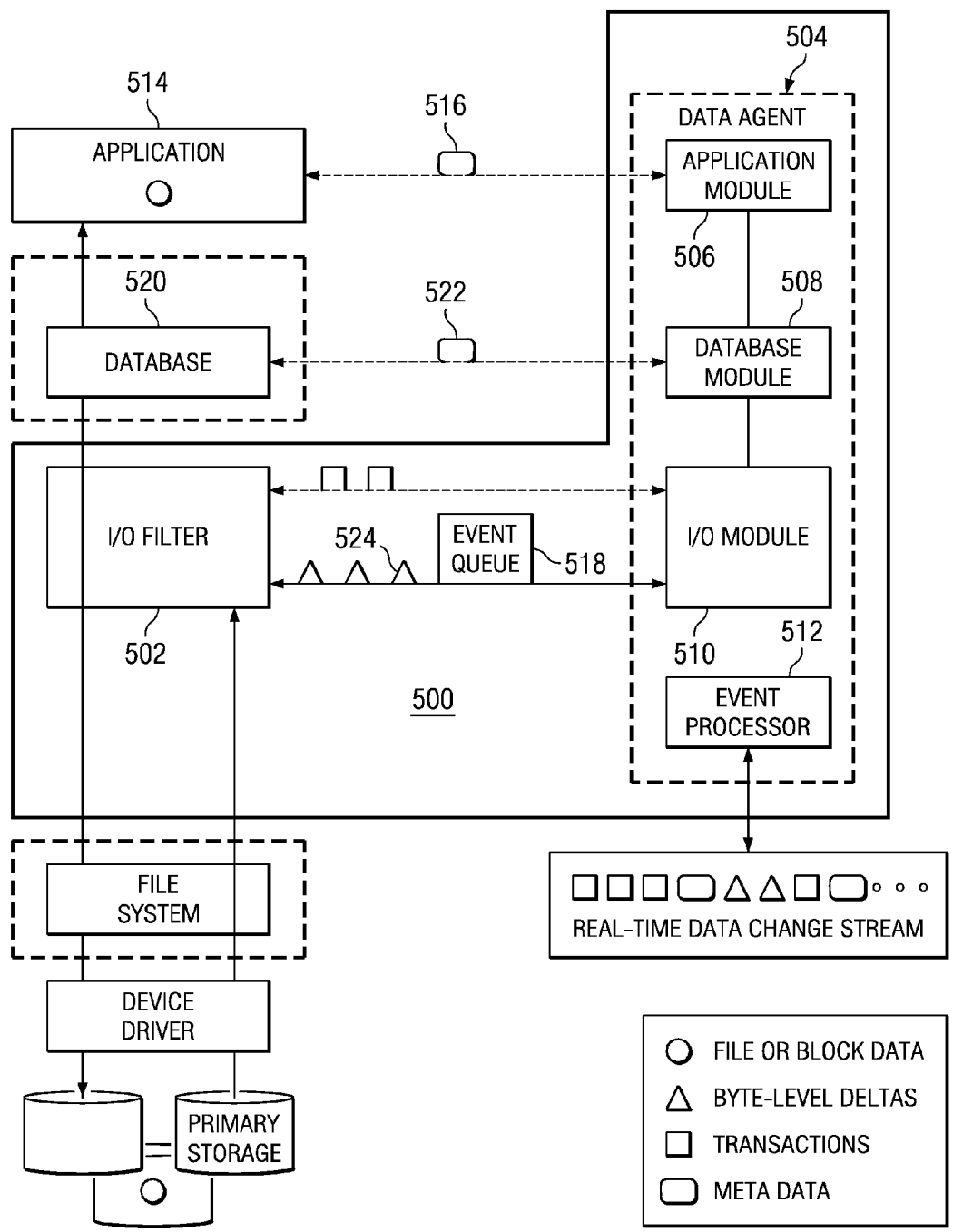
FIG. 5 is a representative host driver according to a preferred embodiment of the present invention having an I/O filter and one or more data agents.

Referring now to FIG. 5, an illustrative embodiment is shown of a DMS host driver 500. As noted above, the host driver 500 may be embedded in the host server where the application resides, or in the network on the application data path. By capturing data through the application, fine grain data is captured along with application events, thereby enabling the DMS cluster to provide application aware data services in a manner that has not been possible in the prior art.

In this embodiment, a host server embedded host driver is used for illustrating the driver behavior. In particular, the host driver 500 in a host server connects to one of the DMS nodes in a DMS cluster (in a DMS region) to perform or facilitate a data service. The host driver preferably includes two logical subsystems, namely, an I/O filter 502, and at least one data agent 504. An illustrative data agent 504 preferably includes one or more modules, namely, an application module 506, a database module 508, an I/O module 510, and an event processor or event processing engine 512. The application module 506 is configured with an application 514, one or more network devices and/or the host system itself to receive application level events 516. These events include, without limitation, entry or deletion of some critical data, installation or upgrade of application software or the operating system, a system alert, detecting of a virus, an administrator generated checkpoint, and so on. One or more application events are queued for processing into an event queue 518 inside or otherwise associated with the data agent. The event processor 512 over time may instruct the application module 506 to re-configure with its event source to capture different application level events.

If an application saves its data into a database, then a database module 508 is available for use. The database module 508 preferably registers with a database 520 to obtain notifications from a database. The module 508 also may integrate with the database 520 through one or more database triggers, or it may also instruct the database 520 to generate a checkpoint 522. Because the binary tables of a running database are not consistent in the persistent storage and the associated files are never closed, creating a checkpoint in allows the reconstruction of the database to a consistent state during data recovery. The database module 508 may generate a checkpoint by locking the database 520 to force a database manager (not shown) to flush out its data from memory to disk, thereby generating a consistent disk image (a binary table checkpoint). This process is also known as "quiescing" the database. After a consistent image is generated, the database module 508 then lifts a lock to release the database from its quiescent state. The database events preferably are also queued for processing into the event queue 518. Generalizing, database events include, without limitation, a database checkpoint, specific database requests (such as schema changes or other requests), access failure, and so on. As with application module, the event processor 512 may be used to re-configure the events that will be captured by the database module.

The I/O module 510 instructs the I/O filter 502 to capture a set of one or more I/O events that are of interest to the data agent. For example, a given I/O module 510 may control the filter to capture I/O events synchronously, or the module 510 may control the filter to only capture several successful post I/O events. When the I/O module 510 receives I/O events 524, it forwards the I/O events to the event queue 518 for processing. The event processor 512 may also be used to re-configure the I/O module 510 and, thus, the I/O filter 502.

The event processor 512 functions to generate an application aware, real-time event journal (in effect, a continuous stream) for use by one or more DMS nodes to provide one or more data services. Application aware event journaling is a technique to create real-time data capture so that, among other things, consistent data checkpoints of an application can be identified and metadata can be extracted. For example, application awareness is the ability to distinguish a file from a directory, a journal file from a control or binary raw data file, or to know how a file or a directory object is modified by a given application. Thus, when protecting a general purpose file server, an application aware solution is capable of distinguishing a file from a directory, and of identifying a consistent file checkpoint (e.g., zero-buffered write, flush or close events), and of interpreting and capturing file system object attributes such as an access control list. By interpreting file system attributes, an application aware data protection may ignore activities applied to a temporary file. Another example of application awareness is the ability to identify a group of related files, directories or raw volumes that belong to a given application. Thus, when protecting a database with an application aware solution, the solution is capable of identifying the group of volumes or directories and files that make up a given database, of extracting the name of the database, and of distinguishing journal files from binary table files and control files. It also knows, for example, that the state of the database journal may be more current than the state of the binary tables of the database in primary storage during runtime. These are just representative examples, of course. In general, application aware event journaling tracks granular application consistent checkpoints; thus, when used in conjunction with data protection, the event journal is useful in reconstructing an application data state to a consistent point-in-time in the past, and it also capable of retrieving a granular object in the past without having to recover an entire data volume.

Figure 6:
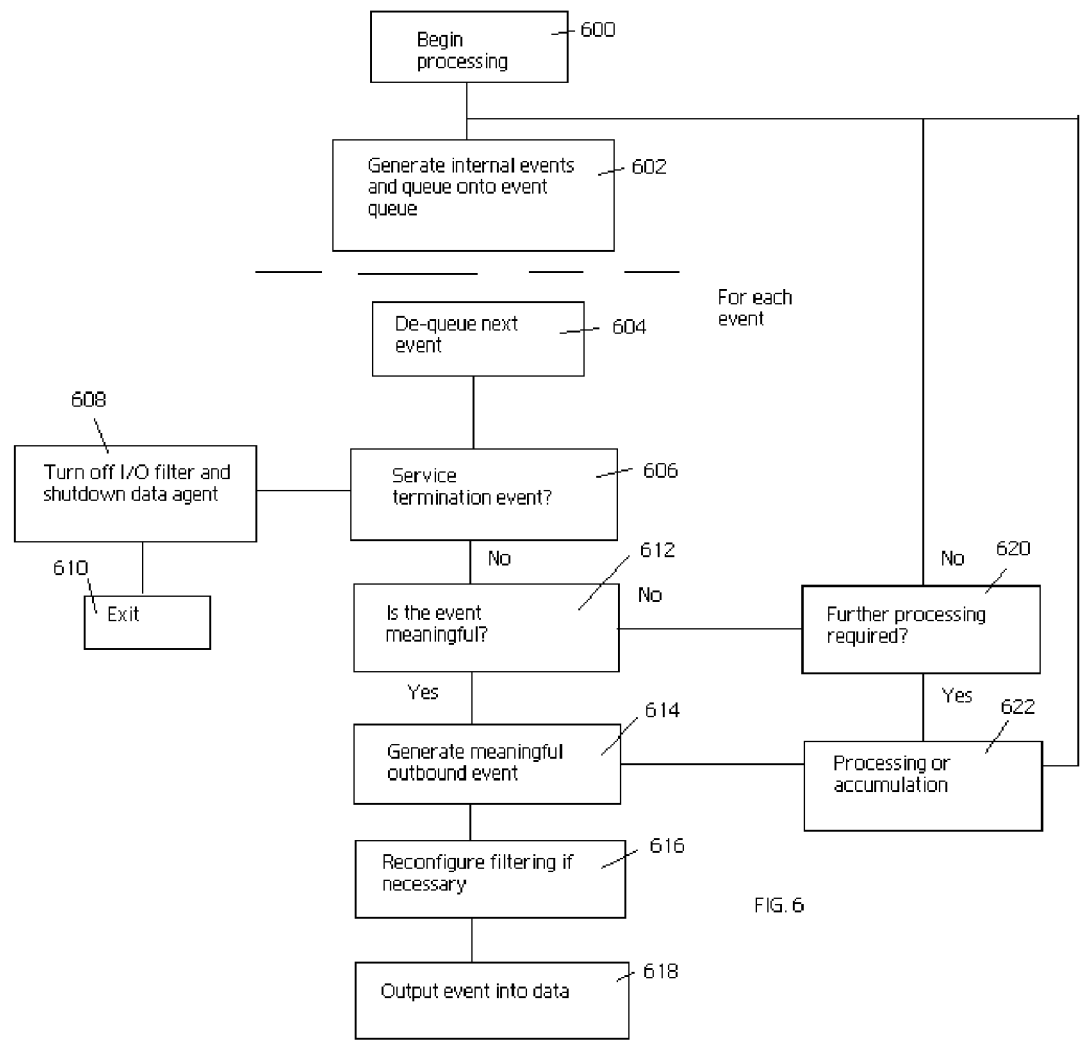
FIG. 6 is an illustrative process flow for an event processing routine that is implemented by an event processor module of the data agent.

The process flow diagram in FIG. 6 illustrates a representative event processing routine that may be implemented by the event processor 512 for this purpose. The routine begins at step 600. At step 602, the event processor generates one or more "internal" events as needed and queues each internal event onto the event queue. The particular internal event generated depends on the processing mode being carried out by the event processor. Thus, for example, if the event processor is uploading an initial baseline data set to the DMS, it may generate an internal "upload request" event. Preferably, events in the event queue are then processed one at a time, although this is not a limitation of the invention. Thus, for each event, the routine continues as follows. As step 604, a next event is de-queued from the event queue. A test is then performed at step 606 to determine whether the event is a service termination event, i.e., an event that terminates the data service. If the outcome of the test at step 606 indicates that the event is a service termination event, the routine branches to step 608, wherein the event processor turns off its I/O filter, shuts the data agent down and, at step 610, exits the routine. If, however, the outcome of the test at step 606 is negative, the routine continues at step 612 to verify whether the event is a meaningful data checkpoint event. If the outcome of the test at step 612 indicates that the event is a meaningful data checkpoint event, the routine continues at step 614. At this step, the routine generates a meaningful outbound event, which event may include accumulated data or some current application data. As outbound events are generated, the internal state of the event processor may change, in which case the event processor may have to reconfigure its I/O, database or application event filtering. If so, this reconfiguration occurs at step 616. At step 618, the event is then output to (i.e., concatenated into) the data stream (i.e., the stream being continuously output to the remainder of the DMS). If, however, the outcome of the test at step 612 indicates that the event is not a meaningful data checkpoint, the routine in the alternative branches to step 620. In such case, the raw event may still contain important information that may need to be processed and accumulated. Thus, at step 620, a test is made to determine whether further processing is required. This processing and/or accumulation take place, if needed, at step 622. The accumulated and/or processed data may then be attached to another event and output in the data stream as part of the event journal. To illustrate this possibility, the result of step 622 (or the negative output of step 620) is shown as being returned to either step 602 (to generate a new internal event) or step 614 (to generate a new meaningful outbound event). This completes the processing.

When the real-time event stream is sent to DMS and the processing of that event fails (on DMS), preferably a failure message is sent to the data agent and posted as a given failure event on the event queue. Preferably, the event processor then identifies the original target object of that failure and performs data synchronization on that object in DMS. Thus, a given event being handled by an event processor may be a DMS failure event that must be processed into an outbound event before being included in the data stream.

Because the application module, the database module and the I/O filter capture data and events in real-time continuously, as these raw events are processed the host driver outputs an event journal comprising a stream of outbound application aware, real-time information. As seen in FIG. 5, the journal comprises file or block data 526, byte-level deltas (differences) 528, transactions 530 and metadata 532. Preferably, this event journal is output according to an extensible data management protocol (XDMP), although this is not a requirement of the invention, as any suitable protocol may be implemented for the transport. Real-time event journaling in this manner captures fine grain and consistent data changes for data protection in the DMS, to facilitate data replication through the DMS, and to provide other data services. Indeed, by organizing these meaningful time-based events and data accordingly in the DMS, reconstruction of fine grain application data at any point-in-time can be achieved.

Figure 7:
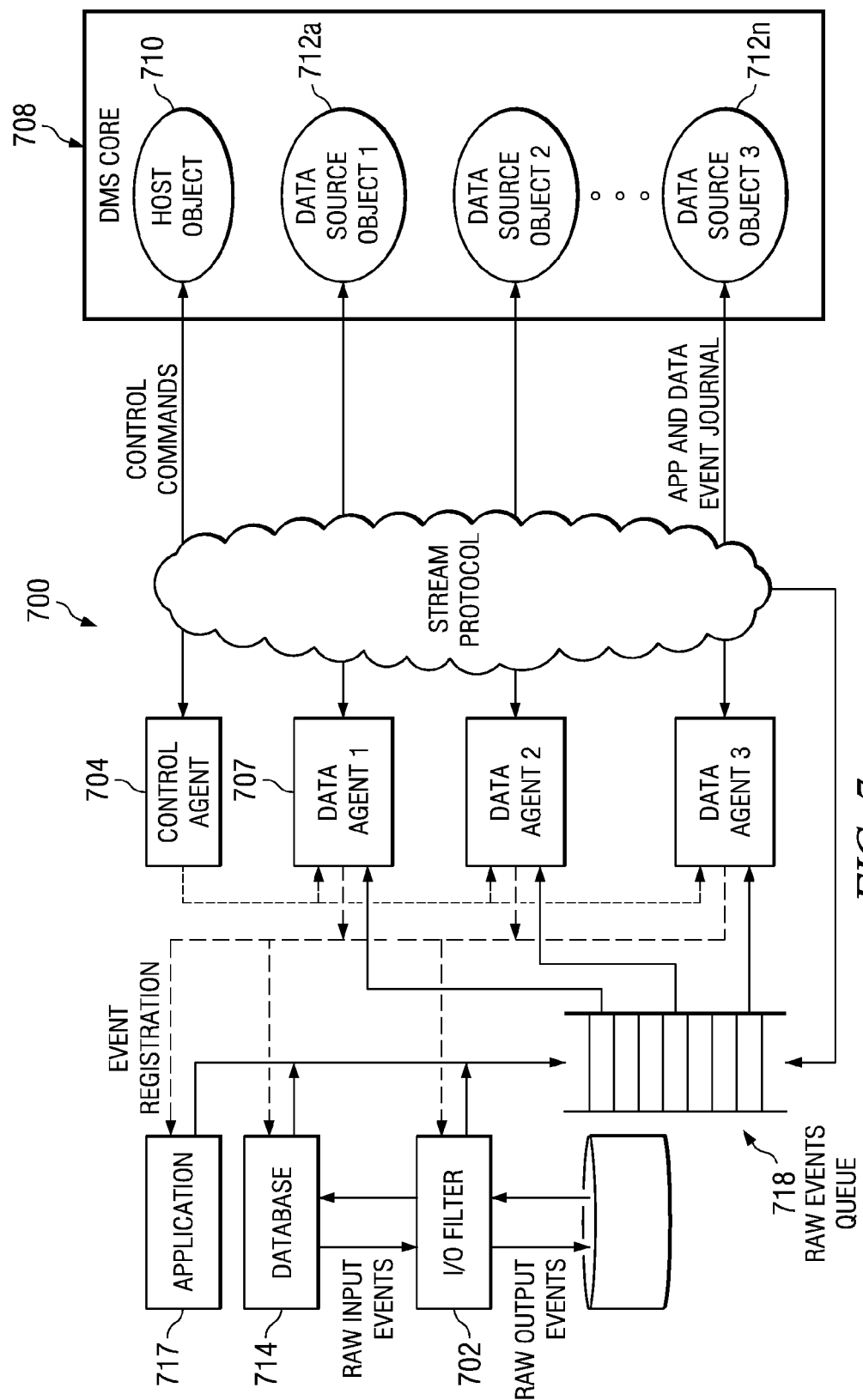
FIG. 7 illustrates the host driver architecture in a more general fashion.

Referring now to FIG. 7, the host driver architecture is shown in a more generalized fashion. In this drawing, the host driver 700 comprises an I/O filter 702, a control agent 704, and one or more data agents 706. The control agent 704 receives commands from a DMS core 708, which may include a host object 710 and one or more data source objects 712*a-n*, and it controls the behavior of the one or more data agents 706. Preferably, each data agent 706 manages one data source for one data service. For example, data agent 1 may be protecting directory "dir1," data agent 2 may be copying file "foo.html" into the host, and data agent 3 may be protecting a database on the host. These are merely representative data service examples, of course. Each data agent typically will have the modules and architecture described above and illustrative in FIG. 5. Given data agents, of course, may share one or more modules depending on the actual implementation. In operation, the data agents register as needed with the I/O filter 702, the database 714 and/or the application 716 to receive (as the case may be): I/O events from the I/O filter, database events from the database, and/or application events from the application, the operating system and other (e.g., network) devices. As described above with respect to the flowchart of FIG. 6, additional internal events or other protocol-specific information may also be inserted into the event queue 718 and dispatched to a given data agent for processing. The output of the event processor in each data agent comprises a part of the event journal.

The host driver components as described above are conveniently implemented as computer software, i.e., a set of program instructions and associated data structures. This is not a requirement of the invention, as the functionality described above (or any part thereof) may be implemented in firmware, in general purpose or special-purpose hardware, or in combinations of hardware and software.

The architecture illustrated in FIG. 7 should not be taken to limit the present invention. A skilled artisan will appreciate that there may one I/O filter and one event queue for each data agent. Of course, a given data agent may have multiple I/O filters, for example, where a database agent is managing several directories each with an I/O filter and an event queue. Other variations, of course, are within the scope of the invention.

Generalizing, the I/O filter captures file system events or block device I/O events according to the configuration from the data agents. Preferably, a data agent instructs the I/O filter both on what events to watch and how the filter should behave when the event arrives. For example, in a file system example, a data agent may instruct an I/O filter to watch for successful post-file-open (file-opened) event of a specific path and, when the event occurs, to gather the user information and queue the event along with the information. (A successful post-file-open event is when a file is successfully opened in the primary file system storage). As another example, the data agent may also instruct the I/O filter to capture a pre-file-open event of a specific directory scope, queue the event, and block the primary I/O until the event is processed. (A pre-file-open event is an open-file request from an application that is not yet processed by the primary file system). As another example, the data agent may further instruct the I/O filter to ignore some subset of events of a specific directory scope, or a specific device volume.

Figure 8:
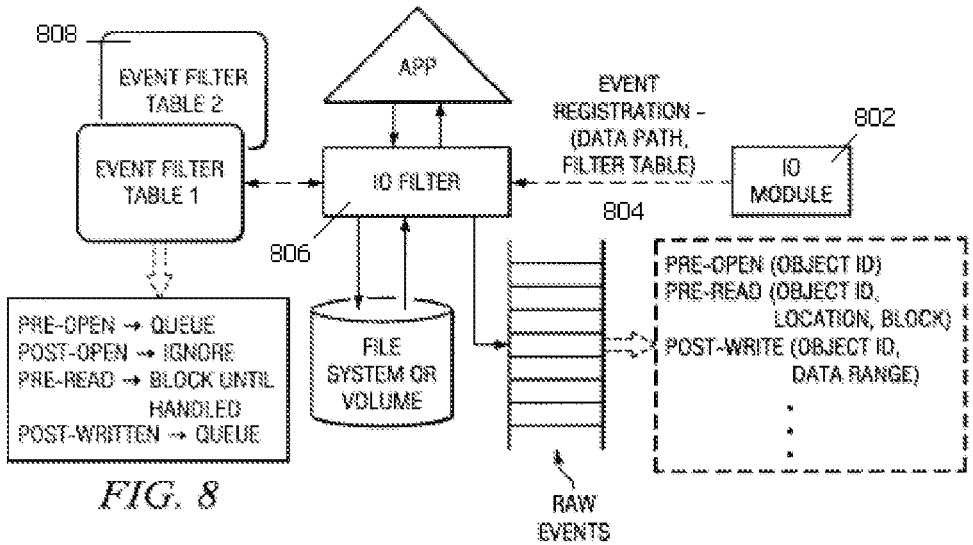
FIG. 8 illustrates a representative I/O filter implementation to handle file system or block operation events.

One embodiment of a filter implementation is shown in FIG. 8. This is an illustrative I/O filter to handle file system or block operation events. Based on the needs of a data agent at a given time, an I/O module 802 of the data agent registers a filtering request 804 with an I/O filter 806. This filtering request typically has two parameters, a data path and a filter table 808. The data path instructs the I/O filter 806 as to the data scope it should cover, and the filter table 808 instructs the I/O filter 806 what events it should filter and how. The I/O module 802 may have multiple I/O event registrations at any point in time. In addition, a given I/O filter 806 may have many pre-defined filter tables 808, each of which preferably is an array of an event type, and a corresponding filter behavior.

The event types for file system I/O, for example, are: pre-directory-create, post-directory-create-failed, directory-created, pre-file-create, post-file-create-failed, file-created, file-open, file-opened, file-open-failed, pre-file-read, file-read, file-read-failed, file-write, file-written, file-write-failed, attribute-change, attribute-changed, attribute-change-failed, permission-change, permission-changed, permission-change-failed, file-delete, file-deleted, file-delete-failed, directory-delete, directory-deleted, directory-deleted failed, and so on. The event types for volume I/O, for example, are: volume-mount, volume-mounted, volume-mount-failed, storage-expand storage-expanded, storage-expand-failed, pre-block-read, block-read, block-read-failed, block-write, block-written, block-write-failed, etc. The behavior may be—ignore, queue, queue and then block until handled, get data and queue, and so forth. As can be seen, in addition to simply filtering the I/O activities, the filter behavior may include retrieving application data (or application metadata) from the primary storage. For example, when a file-open event arrived, the I/O filter may have to retrieve the full-path of the file, the user ID, as well as the node ID of the file.

Figure 9:
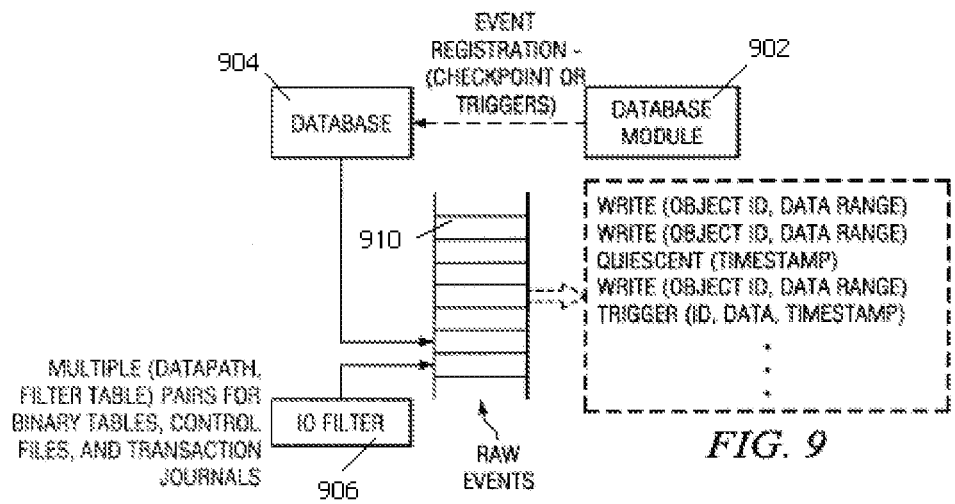
FIG. 9 illustrates a representative I/O filter implementation to handle database and I/O events.

FIG. 9 shows another embodiment of an I/O filter. This filter may be used to handle database and I/O events. In this example, the data agent includes a database module 902 associated with a database 904 and the I/O filter 906. The database module 902 registers with database triggers 908, e.g., to generate database events, to extract a database event log, or to self-generate database lock events (to quiesce a database). These events are queued, either by database triggers or by the database module itself, into the event queue 910. Preferably, a data agent is an intelligent entity. When it receives I/O and database events, it combines these events to generate meaningful database checkpoint events, such as DB-Transaction, DB-checkpoint, and so on.

Figure 10:
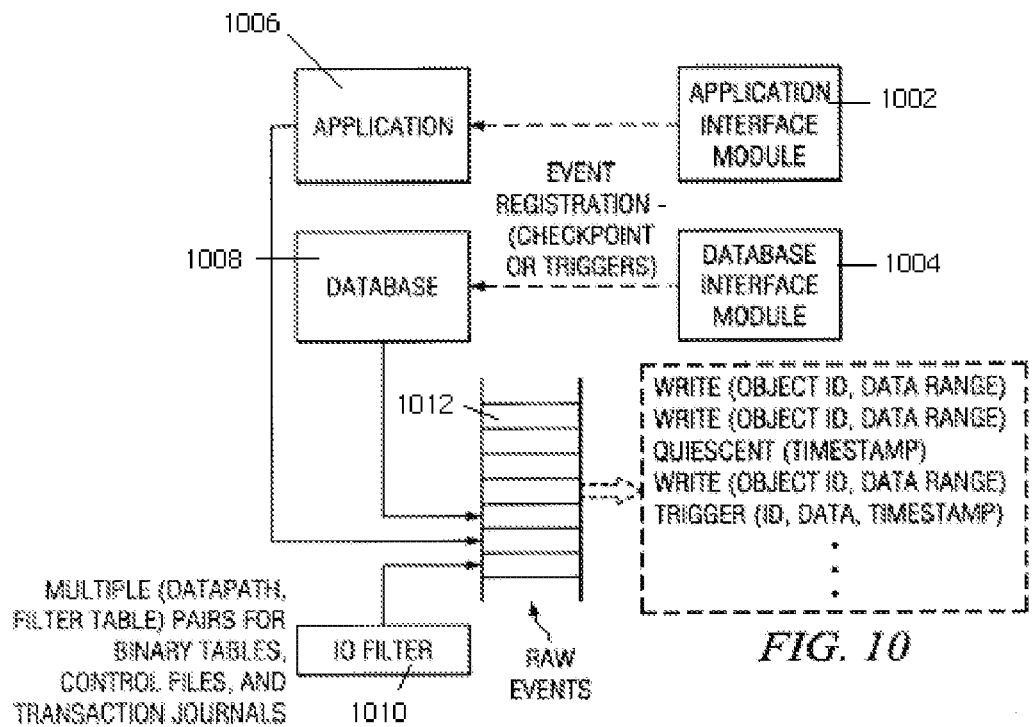
FIG. 10 illustrates a representative I/O filter implementation to handle application, database and I/O events.

FIG. 10 illustrates another I/O filter implementation. This filter may be used to handle filtering application, database and I/O events. In this example, the data agent has both its application module 1002 and its database module 1004 turned on. The application module 1002 registers for event notification from an application 1006, the operating system, or some network devices. It may also monitor a system event log and generate alerts. Database module 1004 registers for event notification from a database 1008. An I/O filter 1010 is also used, as described above. Preferably, all application events are queued into the event queue 1012, either by the application, system, devices, or by the application module itself. As has been described, the data agent processes all the events and generates meaningful output events that may accompany some application metadata and data for shipping to the DMS core.

A given data agent may filter some events a synchronously and some event synchronously based on its need. The particular filtering behavior preferably is encoded into an event filter table.

With the above as background, the following sections describe in more detail how real-time event journaling can be used to provide file system protection and database protection. These illustrative data services should not be taken to limit the scope of the present invention, as the event journaling methods and systems described above and illustrated in FIGS. 5-6 are intended to have broad applicability as they relate to implementation of a broad range of data services.

File System Protection—Real-Time Event Journaling

In one embodiment, a file system data agent is used to protect a file system. In this case, let us first assume that only asynchronous data protection is required. In such case, the event processor then instructs the I/O filter to capture I/O events asynchronously, in which case, only successful post-events are captured. Then, the raw I/O events comprise successful file system responses, namely: directory-created, file-created, directory-deleted, file-deleted, file-opened-write, file-written, directory-renamed, file-renamed, directory-moved, file-moved, permission-changed, file-flushed, file-truncated, file-closed, directory-attribute-changed, and file-attribute-changed. Most of the I/O events carry some data and metadata, for example, directory-created, file-created, file-opened-write also include the information of the user who opened or created the file or directory.

In some cases, the I/O filter is instructed by a data agent through a filter table to extract more metadata and/or user information to accompany the I/O events to be queued.

In the alternative, assume it is required that both system event and network events are to be captured. In this case, as noted above, the application module gets information from the system event log, and well as from other network devices. The application level events may include all or part of the following events: system start time, application start time, application terminate time, software upgrade, OS patches, security alert, network overload, virus alert, and unusual network events. In this example, typically the database module is turned off and the event processor of the data agent generates internal events to upload initial baseline file system while simultaneously forwarding the checkpoint events to the DMS. The internal events, for example, are—file-upload, and directory-upload. The event processor may also get results back from the DMS core and may generate a failure event that identifies which target file or directory is affected.

These raw events are processed by the event processor, which determines that file-written, file-truncated, and perhaps other are not meaningful checkpoint events. File-written and file-truncated are not meaningful checkpoint events because, in an application point of view, the state of a file may not be consistent until file-flushed and file-closed events occur. Therefore, the event processor accumulates the information and data that comes with file-written and file-truncated as was previously described in the context of FIG. 6.

From here on, all other events typically are checkpoint events. When a file-flushed or file-closed event arrives, the event processor takes the accumulated data from all the file-written events, calculates and extracts the actual changes (i.e. the delta strings). Finally, the event processor attaches the delta strings with the file-flushed or file-closed checkpoint event to the DMS. The process of calculating and extracting the actual changes from the accumulated data changes is called a first stage delta reduction process. Assuming that a user inserts several bytes at the beginning of a file, the actual file-written events are a sequence of byte range updates starting at where the new bytes are inserted to the end of the file. A First stage delta reduction process preferably uses a signature-based algorithm to extract a change window that includes the actual byte changes plus a small window of unchanged data depending on the size of the signature window. A signature window is the size of a block of data used for generating a signature. For example, if a signature window is 1K bytes, then inserting 3 bytes into the beginning of a file that is 1 G bytes in length result in close to 1 G bytes of data accumulated from file-written events, and may result in 1003 bytes or less of delta string.

All the other events besides file-written, file-truncated, file-flushed, and file-closed preferably are checkpoint events; the event processor simply packages with these events the necessary data and metadata information, and it sends those processed events to the DMS.

If a service termination request is received, the event processor turns off I/O filtering and frees itself. This processing was described above in the context of FIG. 6.

Given these assumptions, the real-time event journal provided to the DMS node(s) is then a stream of the following events, with each preferably including a time stamp:

directory-created, file-created, directory-deleted, file-deleted, file-opened-write, directory-renamed, file-renamed, directory-moved, file-moved, permission-changed, file-flushed, file-closed, directory-attribute-changed, file-attribute-changed, file-upload, directory-upload, file-delta (re-synchronization)

Optional: system start time, application start time, application terminate time, software upgrade, OS patches, security alert, network overload, virus alert, unusual network events.

Preferably, all the I/O checkpoint events carry user or data information. In this example, File-flushed and file-closed carry one or more delta strings.

Alternatively, an I/O filter can be configured to filter synchronous I/O events. In this case, each checkpoint I/O event includes a pre-event (request) followed by a successful or failure result event (commit or rollback). For example, creation of a directory would involve the following—directory-create, directory-create-commit, and directory-create-rollback. The I/O filter may chose to block the primary I/O until the pre-event is successfully handled by the event processor. By handling I/O events synchronously in this manner, DMS provides a file system data protection service that guarantees consistency with no data loss.

Real-time event journaling for a file system protects a file system in real-time, and it is also capable of recovering the file system (or an object in the file system) to a consistent state in the past. For example, assume a given file system contains several directories and some files, including file A and file B. Assume file A and file B are both opened for update at about 1 PM. File A is modified (write) at 1:20 PM and flushed (checkpoint) at 1:25 PM. File B is modified (write) at 1:29 PM, the modification is written to the disk, but the application has not issued a file flush because the change is not completed yet (because, e.g., the application only wrote half of a record). At 1:30 PM, assume the file system is corrupted and an IT administrator needs to recover the file system to a consistent state (namely, the state at 1:29 PM). Using the inventive real-time event journaling technique, the DMS is capable of re-constructing the file system with the modification of file A recovered (which is committed at 1:25 PM); the modification of file B is not completed and therefore inconsistent at 1:29 PM. With either block journaling or file system journaling technique, modification of file B would be re-introduced for the 1:29 PM reconstruction, which may result in recovering a corrupted file Database Protection—Real-Time Event Journaling In another embodiment, a database data agent is created to protect a relational database that stores the data from an application. Assuming that the database uses a file system to store its data, there are several pre-created directories. Within those directories there are typically three sets of files. In particular, there are files for configuration data, files for binary tables, and files for database transaction journals. During runtime, a database always keeps its journal and binary table files open; thus, it may not be possible to capture a point-in-time when a database's binary and journal are consistent and in synchrony. The present invention addresses this deficiency in the prior art.

In particular, according to the present invention, a given data agent is database aware (application aware). In an illustrative embodiment, this means the data agent is capable of identifying the group of files and directories (or volumes) that belong to the database; preferably, it is also capable of distinguishing the journal files from the control and binary table files. To begin a real time data protection, preferably a database data agent uploads the initial baseline of all the files and directories that belong to the database to the DMS. This technique is described, for example, in U.S. Pat. No. 7,096, 392, which is commonly assigned. The data agent carries out the upload while the database is running; preferably, the data agent forwards all the updates to the DMS as it is uploading.

The database data agent uses I/O filter to gather all the updates to all the database files and directories. The event processor processes the I/O events according to the type of files the events belong. When a database receives a request, it always writes the transaction (redo and undo) operations into its journal and commits the journal (as flush events, or write events that use zero-buffered write) into the primary storage before actually updating the binary tables. The database manager updates the binary tables after flushing the journal, and for better performance, it may keep the binary table modification in memory for a period of time before committing the changes (or portions thereof) into the primary storage. Before committing the changes, the I/O filter does not see the changes. A database manager may periodically flush its memory to the primary storage. Thus, during runtime, the state of the binary tables in the primary storage device is almost always behind the state of the journal files. This also means that, during runtime, the state of the binary table files is almost always inconsistent. There is only one way to guarantee the binary table consistency, namely, to lock the database table, in other words, to force the database manager to flush out the changes from its memory. As noted above, this is also called "quiescing" a database. It is at this time that the database module is needed.

In runtime, when an event processor sees a file-write event (on a zero-write-buffer log file), or a file-write and file-flush event pair (if the log file has a write buffer) for a journal file, it knows that chunks of data collected in the file-write are one or multiple intact transaction record(s), not partial updates. The data agent forwards to the DMS, in real-time, each chunk of transaction record along with a DB-Transaction event the event processor generated; a DB-Transaction event and the data chunk represents a transaction checkpoint. If the data agent sees a file-created event on a directory where the journal file resides, it knows that a new journal file is created. In a representative embodiment, all these are meaningful checkpoint transaction events that are captured and shipped to the DMS in real time so that there is no data loss. When the event processor of the data agent receives file-write events for the binary tables, preferably it simply accumulates the data updates, as these events do not represent any consistent checkpoint. When the database module issues a "lock tables" command to the database to force the database into quiescent mode, the database manager preferably immediately flushes out all the binary table changes from its memory. These binary table updates are then captured by the I/O filter and accumulated at the event processor. The database module then queues a DB-Checkpoint event to the event processor at which point the event processor knows that the combination of the baseline binary tables and all the accumulated changes to the binary tables comprise a consistent binary table state. Preferably, it then calculates the deltas from the accumulated changes (of the binary tables), creates a database checkpoint event, and sends the event along with the deltas to the DMS.

When a database receives a request, it always writes the transaction (redo and undo) operations into its journal. So, by capturing a file-write event in the log files, a transaction record can be captured in real time.

As configuration changes, a database manager updates the configuration files and flushes the changes at the right point in time. The same I/O event capturing and processing is then carried out as in the file system example.

Figure 11:
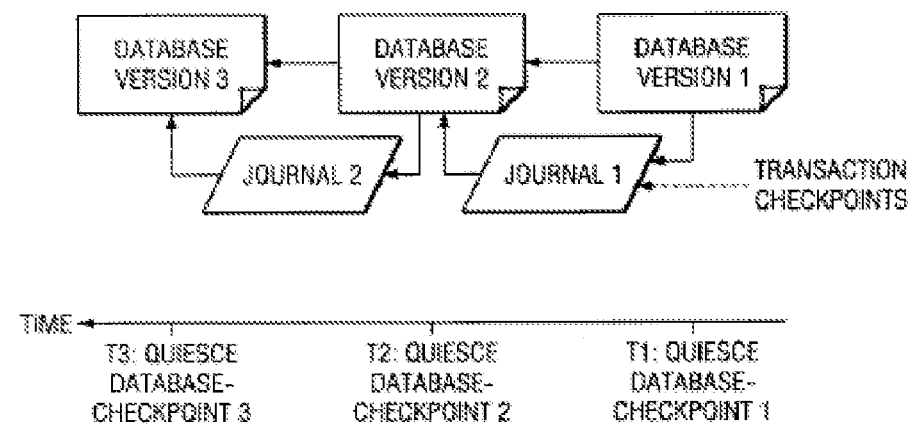
FIG. 11 illustrates DMS database captures.

Suppose, for example, DB-Checkpoint 1 is generated at 1 PM, and DB-checkpoint 2 is generated at 2 PM. Suppose now that a database administrator wants to recover a database to 1:30 PM. The DMS and the host driver is capable of re-constructing the set of control files, binary table files, and the journal log files at DB-checkpoint1 at the host; it then rolls forwards a subset of the journal records in the journal log to re-construct a consistent database at 1:30 PM. FIG. 11 illustrates such database captures.

The I/O Filter may be configured to capture the following file I/O events associated to all the database files and directories:—file-created, file-deleted, file-written, file-truncated, file-renamed, file-moved, permission-changed, file-flushed, and file-attribute-changed.

The database module may extract events from the database event log and self create database checkpoint, e.g., by issuing SQL Lock Table commands. The Database module events may include all or part of the following events:—DB-checkpoint, access-failure, DB-alert, and so forth.

In this example, the application module may or may not be turned on. If it is turned on, the application module may produce all or part of the following events:—system start time, application start time, application terminate time, software upgrade, OS patches, security alert, network overload, virus alert, and unusual network events.

Recalling the description above with respect to FIG. 6, the database event processor may generate internal events when required depending on its processing mode. For example, when a database is protected for the first time, the event processor must upload the initial baseline data. The event processor in this case repeatedly generates internal DB-Upload events.

In the case where non-zero write buffering is used on a journal file, the event processor determines that file-written and file-truncated events are not checkpoint events. The changed data and information from these events are processed and accumulated. In the case where zero write buffering is used on journal file, the event processor determines that file-written and file-truncated events on binary table files are not checkpoint events, and these events on the particular journal file are checkpoint events All other events are checkpoint events. When file-flushed arrived for a journal file, the entire written record accumulated through file-written is packaged into a new event called DB-Transaction (data record). When file-flushed arrives for the control files, the event processor extracts the delta strings from the accumulated file-written data and sends the checkpoint data to the DMS node. The event processor may periodically calculate the delta strings of the binary table files. When DB-checkpoint event arrives, the delta strings of the binary table files are attached to that event and shipped to the DMS node. All the other events are checkpoint events and they are processed in the manner previously described.

When the event processor receives an DB-Upload event, it reads the necessary information and ships it to the DMS node. DB-Upload event can be processed simultaneously with the other I/O events. The latest information always gets streamed to the DMS node.

To eliminate the possibility of data loss, a database data agent may capture I/O events synchronously just for the transaction journal files to ensure than any data that enters the journal files is pre-forwarded to the DMS. In this case, both the pre-write-event and post-write-event associated with the log files must be captured. The pre-write-event would be file-write(data), the post-write-event would be file-written-commit(success) or file-write-rollback(failed). The file-write events result in DB-transaction events being generated, while file-written events result in DB-rollback or DB-commit events being generated.

Given the above-described database behavior, the database real-time event journal is a stream of the following events, each including a time stamp:

All files:
DB-Upload, file-created, file-deleted, file-delta, file-truncated, file-renamed, file-moved, permission-changed, file-attribute-changed
Binary table files:
DB-checkpoint
Transaction files:
DB-transaction(record), DB-rollback (for synchronous data services),
DB-commit (for synchronous data services)
Configuration files:
file-flushed,
Overall (optional):
access-failure, DB-alert, system start time, application start time,
application terminate time, software upgrade, OS patches, security alert,
network overload, virus alert, and unusual network events FIG. 11 illustrates a database a DMS captures. At DB-checkpoints (1101, 1104, and 1106), the binary tables and the transaction log are in synchronous state, and the binary table files are consistent. Transaction journals are captures as a sequence of consistent DB-transaction (record) events. Each transaction record is a small checkpoint. This structure guarantees that a consistent database is reconstructable to any point-in-time in the past. One can always take the data at a DB-checkpoint, and roll forward each individual transaction from DB-transaction (record) to reconstruct the database.

If a database is created using raw block devices, it is usually the case that there is one raw volume for the binary data tables, one raw volume for the control information, and another raw volume for the journals. In some cases, the binary data tables and the control information may be in one volume. In this case, the database data agent preferably treats each volume as a file. The database data agent captures journal records and preferably generates DB-Transaction as write operations on the journal volumes captured. Further, preferably the database data agent generates DB-checkpoints when the database module triggers the database to quiesce and, at that time, the data agent calculates the deltas from the accumulated changes to the binary table volume and control information volume. The database data agent behavior in this case is very similar to the database data agent managing a file-based database.

Likewise, real-time event journaling can also be applied on a clustered database such as Oracle RAC. Oracle RAC is a known configuration where there are two or more host servers connecting to one shared storage cluster. The host servers each have an instance of a database manager accessing the shared database data in parallel. There is only one copy of data in the primary storage. In this case, there is one database image (with history) in the DMS. This image may be considered the database data source in the DMS. In this embodiment, there would be one data agent on each of the clustered database host. If the clustered database is a three node cluster (three host servers), then there would be three instances of database data agents, one on each host. Preferably, all the data agents would then connect to the same data source in the DMS. Each captures journal records, generates and forwards DB-Transaction events to the same data source object in the DMS. The DMS would then coordinate with all the data agents to have their database modules issue "lock tables" simultaneously. This way, all database instances flush out their binary table updates, and the data agents can then calculate the latest deltas using the consistent binary tables in the primary storage. The behavior of each data agent is similar to that described in the single node file-based database case, except that the DMS data source must coordinate with the clustered data agents.

There are applications, such as Microsoft Exchange, that store their data using similar data structure as in a relational database. In the case of an Exchange-based system, there are also control files, binary data files, and journal files. The Exchange data agent behavior is similar to the database data agent with the exception that an application module data agent may be turned on to capture Exchange specific events such as "New message arrived", "message deleted", "Calendar entry changed", and the like.

Of course, the above-described examples are merely illustrative of how the present invention may be used or implemented. They should not be taken to limit the scope of the present invention.

The present invention has numerous advantages over the prior art such as tape backup, disk backup, volume replication, storage snapshots, application replication, remote replication, and manual recovery. Indeed, existing fragmented approaches are complex, resource inefficient, expensive to operate, and often not reliable. They do not function well in failure modes. For example, after a network failure, it is impossible for block journal and file system journaling methods to continue their regular operations without shutting down the applications to perform baseline synchronization. In contrast, with real-time event journaling, after a network failure, a host driver can perform a per-object resynchronization while the application continues to update the data in the primary storage. The host driver generates a sequence of application events that include re-synch events along with all the most current update events. This operation is described, for example, in U.S. Pat. No. 7,096,392.

In addition, from an architectural standpoint, prior art techniques are not well suited to scaling to support heterogeneous, enterprise-wide data management. The present invention overcomes these and other problems of the prior art by providing real-time data management services. As has been described, the invention transparently and efficiently captures the real-time continuous history of all or substantially all transactions and data changes in the enterprise. The solution operates over local and wide area IP networks to form a coherent data management, protection and recovery infrastructure. A data source in a DMS cluster can be subscribed by another DMS cluster or another external host. The same real-time event journal stream is used or useful for real-time data protection, as well as data distribution and replication (among DMS clusters) and between a DMS cluster and an external host server. It eliminates data loss, reduces downtime, and ensures application consistent recovery to any point in time. These and other advantages are provided through the use of an application aware I/O driver that captures and outputs a continuous data stream—in the form of an event journal—to other data management nodes in the system.

The invention provides particular advantages as compared to prior art file system journaling, which require large amounts of unnecessary bandwidth and secondary storage to store the data from all the file-writes. In such systems, unless the data from the file-writes is accumulated, the byte level noise cannot be filtered and the actual byte changes cannot be extracted. Real-time file system journaling lacks application level events; it also does not have fine grain information, such as a full record of an update. Without application level event processing as in the present invention, real-time file system journaling as a data protection solution cannot provide fine grain consistent object checkmarks—such as a consistent checkpoint for each file, and/or a transaction checkpoint. A file system journal also does not capture application and network events, such as when a virus attacked. Without fine grain application-aware data extraction like that provided by the present invention, real-time file system journaling cannot provides consistent fine grain information.

Likewise, there are significant drawbacks with real-time file system or volume journaling for database protection. Large amount of bandwidth and storage is required whenever data is written to the database files. As noted above, a database usually structures its binary tables as large fixed size pages in memory. As data are updated, bits and pieces of a page are updated over time, but the database manager reads and writes the entire page. Without accumulating all the written pages and extracting the deltas at a checkpoint, the real-time file system journaling solutions of the prior art unnecessarily capture all the dirty pages while volume I/O journaling always captures entire device blocks. In addition, real-time file system journaling and volume I/O journaling only capture all generic I/O activities; there is no database checkpoint information in these I/O activities. Therefore, there is no way of identifying a point-in-time when a database is consistent. Most likely, there is no consistent point in a running database unless a tool is used to force a database to a quiescent state. Using these two techniques to backup a database, e.g., after a failure and a restore, such solutions would still have to rely on the database itself to perform crash recovery. Therefore, a consistent recovery cannot be guaranteed. Most importantly, both real-time file system journaling and volume I/O journaling lack application level events; they do not have fine grain consistent information such as a database transaction, a consistent version of a configuration file, a checkpoint version of a database binary table, or the like. Without application level event journaling as in the present invention, real-time file system and volume I/O journaling as data protection solutions cannot provide recovery check marks—such as when a virus attacked. Indeed, without fine grain application-aware data extraction, these solutions cannot provide users consistent fine grain information, such as a sequence of transactions for a given period of time.

In contrast, real-time event journaling according to the present invention combines file system I/O events, database events, application level events, and database structure and/or application knowledge (application-awareness) to generate a sequence of meaningful checkpoint events.

As one of ordinary skill in the art will appreciate, the present invention addresses enterprise data protection and data management problems by continuously protecting all data changes and transactions in real time across local and wide area networks. Preferably, and as illustrated in FIG. 1, the method and system of the invention take advantage of inexpensive, commodity processors to efficiently parallel process and route application-aware data changes between applications and low cost near storage.

One of ordinary skill in the art should appreciate that the data agent illustrated in FIG. 5 is preferred but that various functions may be combined to provide the application-aware data stream. Thus, for example, a host driver may include an I/O filter that captures events without use of a specific I/O module (that provides, e.g., a filter table). In such case, the event processor may then be used to filter off unwanted events. As another alternative, the functionality of the I/O filter and the event processor can be combined. Another alternative is to combine the functionality of the application and database modules, or of the application, database and I/O modules. Thus, the particular configuration illustrated in FIG. 5 and described above should be merely taken for illustrative purposes.

While the present invention has been described in the context of a method or process, the present invention also relates to apparatus for performing the operations herein. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows:

1. Apparatus for use in providing a data service, comprising:
    a filter, located between an application and an associated data storage;
    a module, connectable to the filter, that identifies to the filter a set of one or more requests or responses expected to occur as the application interfaces to the data storage, and a given action to take upon occurrence of each request or response, wherein a given request or response has associated therewith one or more data changes;
    a queue connectable to the filter to receive and store one or more data events generated as a function of the given action, wherein a given data event has associated therewith one or more of the data changes, together with metadata; and
    a processor connectable to the queue to receive the data events, and to process and consolidate the data events by a concatenation operation into a continuous, application-aware, data stream comprising a sequence of application consistent checkpoints, wherein a given application consistent checkpoint is generated as a result of a consolidation of data events and has associated therewith information identifying the data events, the metadata, and the one or more data changes;
    wherein, during processing of a given data event, the processor determines if a particular data event signifies an application consistent checkpoint and, if not, the processor holds the particular data event until the particular data event is subsequently associated with the given application consistent checkpoint.

2. The apparatus as described in claim 1 further including an application module, connectable to the application, and that identifies an application level event, and a given action to take upon occurrence of the application level event.

3. The apparatus as described in claim 1 wherein the processor is further operative to generate a given event and to store the given event in the queue for subsequent processing.

4. The apparatus as described in claim 3 wherein the given event is an internal event that must be processed into an outbound event before being included in the data stream.

5. The apparatus as described in claim 1 wherein the data events include at least one file system event.

6. The apparatus as described in claim 1 wherein the data events include at least one block device I/O event.

7. The apparatus as described in claim 1 wherein the given action retrieves given data from the data storage and forwards the given data to the queue.

8. The apparatus as described in claim 1 wherein the continuous, application-aware, data stream comprises one or more of the following data types: file or block data, byte-level deltas, and transaction data.

9. The method as described in claim 1 wherein the metadata is one of: user information, document properties, file type, and date and time information.

10. Apparatus for use in providing a data service, comprising:
    a filter, located between an application and an associated data storage;
    an input/output module, connectable to the filter, that identifies to the filter a set of one or more requests or responses expected to occur as the application interfaces to the data storage, and a given action to take upon occurrence of each request or response, wherein a given request or response has associated therewith one or more data changes;
    a database module, connectable to a database associated with an application that stores data in the database;
    a queue connectable to the filter and the database module to receive and store one or more data events generated by the database module and the filter as a function of the given action, wherein a given data event has associated therewith one or more of the data changes, together with metadata; and
    a processor connectable to the queue to receive the data events, and to process and consolidate the data events by a concatenation operation into a continuous, application-aware, data stream comprising a sequence of application consistent checkpoints, wherein a given application consistent checkpoint is generated as a result of a consolidation of data events and has associated therewith information identifying the data events, the metadata, and the one or more data changes;
    wherein the processing includes determining if a particular data event signifies an application consistent checkpoint and, if not, hold the particular data event from consolidation until the particular data event is subsequently associated with the given application consistent checkpoint.

11. The apparatus as described in claim 10 wherein the processor is further operative to generate a given event and to store the given event in the queue for subsequent processing.

12. The apparatus as described in claim 11 wherein the given event is an internal event that must be processed into an outbound event before being included in the data stream.

13. The apparatus as described in claim 10 wherein the data events include at least one database event.

14. The apparatus as described in claim 10 wherein the continuous, application-aware, data stream comprises one or more of the following data types: file or block data, byte-level deltas, and transaction data.

15. A method of monitoring an application in communication with a data storage to facilitate provision of a data service, comprising:
    identifying a set of one or more requests or responses expected to occur as the application interfaces to the data storage, and a given action to take upon occurrence of each request or response, wherein a given request or response has associated therewith one or more data changes;

as the application interfaces to the data storage, receiving and storing one or more data events generated as a function of a given action, wherein a given data event has associated therewith one or more of the data changes, together with metadata; and processing and consolidating the data events by a concatenation operation into a continuous, application-aware, data stream comprising a sequence of one or more application consistent checkpoints, wherein a given application consistent checkpoint is generated as a result of a consolidation of data events and has associated therewith information identifying the data events, the metadata, and the one or more data changes;

wherein the processing includes determining if a particular data event signifies an application consistent checkpoint and, if not, holding the particular data event from consolidation until the particular data event is subsequently associated with the given application consistent checkpoint.

16. The method as described in claim 15 wherein the data service is data protection.

17. The method as described in claim 15 wherein the data service is data replication.

18. The method as described in claim 15 wherein the data service is data distribution.

19. The method as described in claim 15 wherein the metadata is one of: user information, document properties, file type, and date and time information.

* * * * *

UNITED STATES PATENT AND TRADEMARK OFFICE
CERTIFICATE OF CORRECTION

| | |
|---|---|
| PATENT NO. | : 7,565,661 B2 |
| APPLICATION NO. | : 10/842286 |
| DATED | : July 21, 2009 |
| INVENTOR(S) | : Siew Yong Sim-Tang |

Page 1 of 1

It is certified that error appears in the above-identified patent and that said Letters Patent is hereby corrected as shown below:

In Column 11, Third Paragraph, Line 39
    Replace --a synchronously-- with "asynchronously"

Signed and Sealed this

Sixth Day of April, 2010

David J. Kappos
*Director of the United States Patent and Trademark Office*